United States Patent
Kulli et al.

(10) Patent No.: US 11,436,073 B2
(45) Date of Patent: Sep. 6, 2022

(54) FAULT INDICATIONS FOR STORAGE SYSTEM COMMANDS

(71) Applicant: HEWLETT PACKARD ENTERPRISE DEVELOPMENT LP, Houston, TX (US)

(72) Inventors: Prashant Kulli, Singapore (SG); Randy Gilbert, Cary, NC (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/951,460

(22) Filed: Nov. 18, 2020

(65) Prior Publication Data

US 2022/0156139 A1 May 19, 2022

(51) Int. Cl.
*G06F 11/00* (2006.01)
*G06F 11/07* (2006.01)
*G06F 16/18* (2019.01)

(52) U.S. Cl.
CPC ...... *G06F 11/0772* (2013.01); *G06F 11/0727* (2013.01); *G06F 11/0751* (2013.01); *G06F 16/1873* (2019.01)

(58) Field of Classification Search
CPC ............. G06F 11/0772; G06F 11/0727; G06F 11/0751; G06F 16/1873
USPC ...................................................... 714/1–57
See application file for complete search history.

(56) References Cited

U.S. PATENT DOCUMENTS

| | | | |
|---|---|---|---|
| 6,496,900 B1 | 12/2002 | McDonald et al. | |
| 7,197,669 B2 | 3/2007 | Kong et al. | |
| 7,793,264 B2 | 9/2010 | Finley, Jr. et al. | |
| 8,117,493 B1* | 2/2012 | Fultz | G06F 11/2094 714/6.23 |
| 8,473,697 B1 | 6/2013 | Tiwari et al. | |
| 8,665,750 B2* | 3/2014 | Ramachandran | H04W 24/04 370/254 |
| 2008/0010557 A1* | 1/2008 | Kume | G11B 27/36 714/47.2 |
| 2010/0287407 A1* | 11/2010 | Basu | G06F 11/2094 714/6.12 |
| 2011/0022882 A1* | 1/2011 | Jaehde | G06F 11/203 714/4.1 |
| 2011/0178987 A1* | 7/2011 | Choi | G06F 11/1464 707/646 |
| 2012/0036315 A1* | 2/2012 | Reohr | G11C 11/4099 711/105 |
| 2014/0351632 A1* | 11/2014 | Grube | G06F 11/1076 714/6.24 |

(Continued)

OTHER PUBLICATIONS google.com, "Detect and Diagnose Crashes"; printed from webpage: https://developer.android.com/games/optimize/crash; Jun. 30, 2020; 10 pages.

(Continued)

*Primary Examiner* — Sarai E Butler
(74) *Attorney, Agent, or Firm* — Trop, Pruner & Hu, P.C.

(57) ABSTRACT

In some examples, a system receives a command for an operation involving a storage system, compares attributes associated with the command to a signature, the signature based on a storage volume characteristic and a configuration of the storage system, and responsive to the comparison of the attributes associated with the command to the signature, indicates a potential fault associated with the operation indicated by the command.

20 Claims, 4 Drawing Sheets

(56) References Cited

U.S. PATENT DOCUMENTS

| | | | |
|---|---|---|---|
| 2015/0161000 A1* | 6/2015 | Kim | G06F 3/0608 |
| | | | 714/6.24 |
| 2015/0205722 A1* | 7/2015 | Chiu | G06F 11/2094 |
| | | | 714/4.11 |
| 2015/0242298 A1* | 8/2015 | Cain, III | G06F 9/467 |
| | | | 714/47.3 |
| 2015/0363288 A1* | 12/2015 | Frick | G06F 1/28 |
| | | | 714/6.3 |
| 2016/0179636 A1* | 6/2016 | Fitzpatrick | G06F 11/3006 |
| | | | 714/4.12 |
| 2017/0359320 A1* | 12/2017 | Brandwine | H04L 63/126 |
| 2018/0329645 A1* | 11/2018 | Guerra Delgado | G06F 3/067 |
| 2019/0146885 A1* | 5/2019 | Chen | G06F 11/1446 |
| | | | 714/15 |
| 2020/0050769 A1* | 2/2020 | Bhosale | G06F 16/907 |
| 2021/0065783 A1* | 3/2021 | Duval | G11C 7/065 |

OTHER PUBLICATIONS

NVM Express, NVM Express over Fabrics, Revision 1.1, Oct. 22, 2019 (83 pages).

NVM Express, Revision 1.4b, Base Specification, Revision 1.4b, Sep. 21, 2020(406 pages).

* cited by examiner

FAULT INDICATIONS FOR STORAGE SYSTEM COMMANDS

BACKGROUND

A storage system can include a storage device or a number of storage devices. A computing environment can include multiple storage systems. For example, a computing environment can include a data center, a cloud environment, an enterprise environment, or any other type of computing environment.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Commands can be issued to perform operations with respect to storage systems. Storage systems can include storage arrays, storage appliances, and so forth. A storage system can include a storage device or multiple storage devices. Examples of storage devices include disk-based storage devices (e.g., hard drives, optical disk drives, etc.), solid-state drives (e.g., flash memory devices, etc.), or other types of storage devices.

In addition, a storage system can include a storage controller that manages data access and other operations relating to the storage device(s) coupled to the storage controller. The storage controller and the storage device(s) of the storage system can be housed together in a housing of the storage system, or the storage controller may be separate from the storage device(s).

Examples of commands can include a command to migrate data from one storage system to another storage system (such as to perform failover or to move data to an upgraded storage system or to a storage system with less load), copy data from one storage system to another storage system (such as for purposes of data backup), creating storage volumes, deleting storage volumes, configuring a storage system, compressing or uncompressing data in a storage system, deduplicating data in a storage system, encrypting or decrypting data in a storage system, and so forth.

A "storage volume" refers to a logical unit of storage that provides a container of data. A storage volume can be stored in a storage system or across multiple storage systems. A storage system can include a single storage volume or multiple storage volumes (or parts of a single storage volume or multiple storage volumes).

In a large computing environment in which a large amount of data may be stored in storage systems, certain commands can take a relatively long time to complete. For example, migrating a large amount of data from a source storage system to a destination storage system can take hours or even days.

If a command specifying an operation involving a storage system were to experience a fault for any reason, then a large amount of time may be wasted due to waiting for the operation to complete, detecting a fault that prevented the operation from completing, and taking action to recover from the fault and to address the fault.

Examples of faults can include any or some combination of the following: an error in data being read or written, a program (including machine-readable instructions) crashing or hanging, a hardware component experiencing an issue that prevents the hardware component from performing a requested action (e.g., executing machine-readable instructions, storing data, communicating data over a network, etc.), or any other issue that prevents a storage system from completing an operation in a target manner.

In some examples, an entity may perform analytics with respect to statistics collected as part of operations (e.g., read/write operations, data migration operations, data copy operations, data deduplication operations, data compression/decompression operations, data encryption/decryption operations, storage system configuration operations, etc.) involving storage systems. The entity that performs such analytics may be associated with an operator or user of the storage systems. Alternatively, the entity that performs the analytics may be associated with a service provider that is different from the operator or user of the storage systems. The service provider or operator/user can include a business concern, a government agency, an educational organization, another type of organization, or an individual. The analytics performed on statistics collected as part of operations of storage systems can be performed by humans, machines, and/or programs.

In some examples, the analytics performed on the statistics can include a visual inspection of the statistics by a human, or can be performed by machines or programs based on use of classifiers or other types of machine learning models.

Examples of statistics on which analytics can be performed include any or some combination of: a quantity of writes and/or reads associated with an operation, a quantity of processors involved in the operation, a storage capacity of memory used by the operation, an amount of network traffic associated with the operation, any indications of faults received during the operation, an amount of time associated with the performance of the operation, and so forth.

Once a fault is identified based on analytics of statistics collected during operations of storage systems, a report can be provided to an operator or user of the storage systems. A "report" can refer to any collection of information (e.g., an email or other message, a document, a summary, a graphical output, and so forth.

The report can include information indicating that certain storage systems in a computing environment may experience faults in response to certain commands. The report may also include information that specifies recommended actions that should be taken to prevent the faults from occurring during operations of the storage systems. For example, the information included in the report and specify that machine-readable instructions (e.g., software, firmware, etc.) of storage systems should be upgraded, hardware components of software storage systems should be upgraded or replaced, characteristics of storage volumes should be modified, and so forth.

In some cases, the operator or user may not perform the recommended actions in the report, such as because the operator or user does not understand the report, because of an oversight by the operator or user, because the operator or user is too busy, etc. Thus, despite being provided with the information that can be used to prevent faults from occurring, the operator or user may nevertheless run into such faults during storage system operations.

In accordance with some implementations of the present disclosure, a system receives a command for an operation involving a storage system, compares attributes associated with the command to signatures, where a signature is based on a storage volume characteristic and a configuration of the storage system, and indicates a potential fault of the command in response to the comparison of the attributes of the command to the signature. Note that an operation "involving a storage system" can refer to an operation that involves a single storage system or an operation that involves multiple storage systems.

Figure 1:
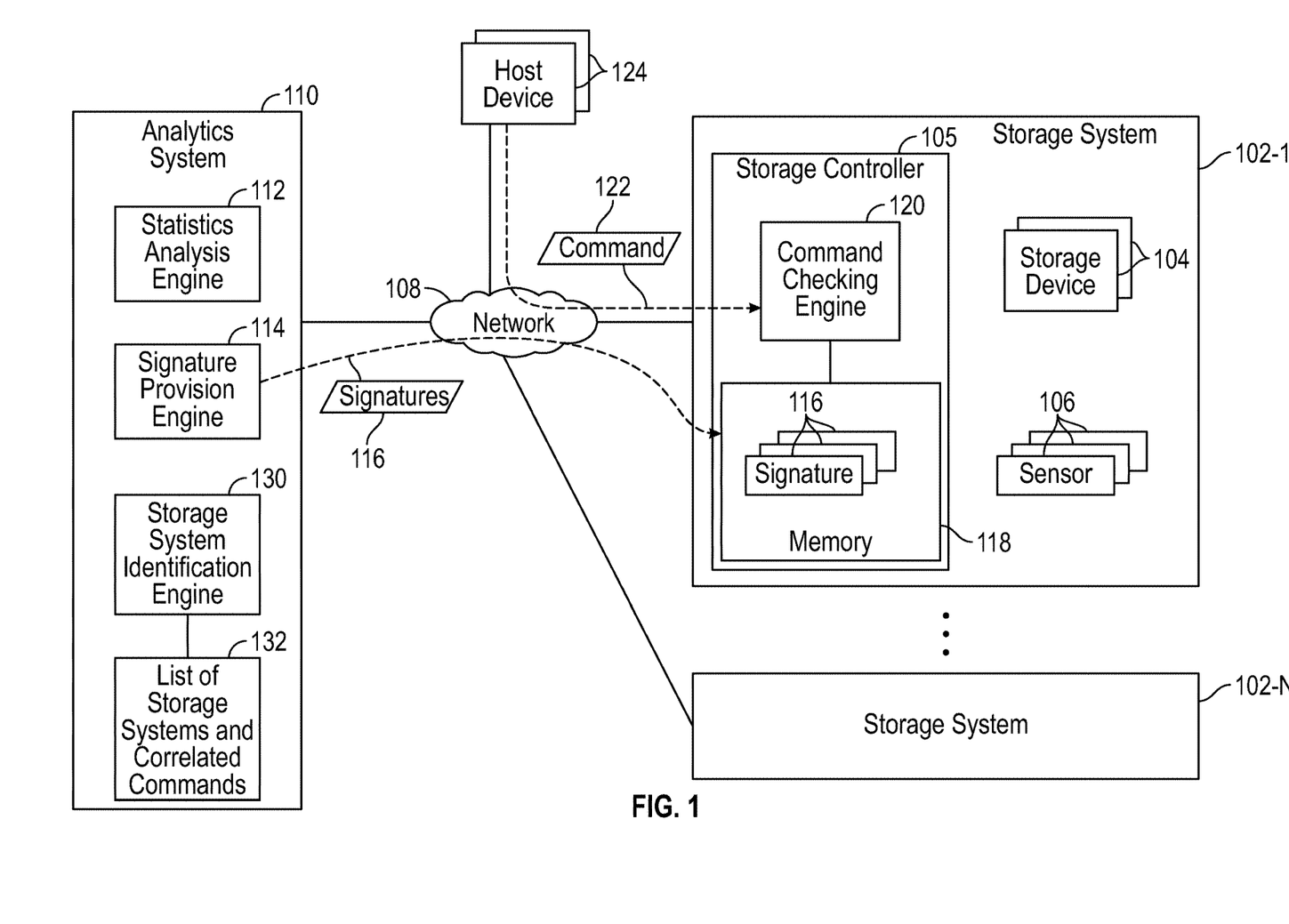
FIGS. 1-3 are block diagrams of arrangements that include storage systems and command checking engines, according to some examples of the present disclosure.

FIG. 1 is a block diagram of an example arrangement that includes storage systems 102-1 to 102-N, where N≥2. Although FIG. 1 depicts an example arrangement with multiple storage systems 102-1 to 102-N, it is noted that in other examples, an example arrangement may include just one storage system.

The storage system 102-1 includes storage devices 104 and a storage controller 105. The storage controller 105 and the storage devices 104 may be housed in the same housing, or the storage controller 105 and the storage devices 104 may be separate from one another, e.g., provided in separate housings. In other examples, the storage system 102-1 can include just a single storage device 104.

The storage system 102-N can similarly include storage controller and a single storage device or multiple storage devices.

The storage system 102-1 includes various sensors 106 that can collect measurements associated with operations involving the storage system 102-1 (and possibly another storage system). Note that the sensors 106 can include hardware sensors and/or sensors implemented using machine-readable instructions, such as in the form of monitoring agents executed in the storage system 102-1. Moreover, although FIG. 1 shows the sensors 106 as being part of the storage system 102-1, in some examples, a sensor 106 can be external of the storage system 102-1.

The storage system 102-N can similarly include sensors to collect measurements associated with operations involving the storage system 102-N (and possibly another storage system).

Measurements collected by sensors in the storage systems 102-1 to 102-N can be transmitted over a network 108 to an analytics system 110. The analytics system 110 may be part of a data center, a cloud system, a server computer, or any other type of computing system. Examples of the network 108 can include a storage area network (SAN), a local area network (LAN), a wide area network (WAN), or any other type of network.

In addition to or as an alternative to measurements collected by the sensors 106, the storage systems 102-1 to 102-N and/or the analytics system 110 and/or another system may include other sources of information associated with operations of the storage systems. Examples of other sources of information can include any or some combination of the following: logs into which are written information relating to storage system operations, a file or a collection of files describing storage system configurations, a dump of data associated with storage system operations, and/or any other source of information.

Information in measurements provided by the sensors 106 and/or other sources can include statistics to be analyzed by a statistics analysis engine 112. Note that the information can include statistics that can be directly analyzed by the statistics analysis engine 112, or alternatively or additionally, the statistics analysis engine 112 can derive statistics based on the information from the sensors and/or other sources.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

The analytics system 110 further includes a signature provision engine 114, which provides signatures 116 based on the analysis performed by the statistics analysis engine 112. In some examples, the signatures 116 can be provided by humans (such as through a user interface of the analytics system 110 or through a user device communicatively coupled to the analytics system 110) in response to the analysis performed by the statistics analysis engine 112. In other examples, the signature provision engine 114 can use classifiers or other machine-learning models to produce the signatures 116 based on the analysis of the statistics performed by the statistics analysis engine 112.

A "signature" can include a pattern of information that is correlated to a potential fault condition associated with a storage system operation indicated by a command. For example, a signature can include a collection of attributes and possibly rules associated with such attributes.

The attributes can include attributes relating to storage volume characteristics (referred to as "storage volume attributes"), and attributes relating to storage system configurations (referred to as "storage system attributes"). A "storage volume characteristic" refers to a characteristic of a storage volume. Examples of storage volume characteristics include any or some combination of the following: a size of a storage volume, a file system version of a storage volume, operational branches associated with a storage volume, an indication of whether a storage volume has been resized, an encryption state of a storage volume, a compression state of a storage volume, a deduplication state of a storage volume, and so forth.

A size of a storage volume can refer to an amount of data (expressed in gigabytes, terabytes, etc., for example) that is stored or that is capable of being stored by the storage volume.

A file system version of a storage volume can refer to which version of a file system data in the storage volume is associated with. A file system refers to a mechanism by which data can be stored in the form of files and directories. A first version of a program (e.g., firmware, software, or other machine-readable instructions) of a storage system may write data in blocks according to a first file system version. A second version of the program may write data blocks according to a second file system version that is different from the first file system version. As an example, if a data migration operation were to occur from a first storage system running the first version of the program to a second storage system running the second version of the program, then incompatibilities between blocks of the first file system version and blocks of the second file system version may be encountered. Such incompatibility issues may also arise for other types of operations.

Operational branches associated with a storage volume can refer to a hierarchy of operations involving the storage volume. For example, a hierarchy of operations involving the storage volume can include first taking a snapshot of the storage volume, followed by cloning the snapshot of the storage volume, followed by restoring from the snapshot of the storage volume, and so forth.

An indication of whether a storage volume has been resized can include a parameter that when set to a first value indicates that the storage volume has been resized (the size of the storage volume has been increased or decreased), and when set to a different second value indicates that the storage volume has not been resized.

An encryption state of a storage volume refers to whether data of the storage volume is encrypted or not encrypted.

A compression state of a storage volume refers to whether data of the storage volume is compressed or not compressed.

A deduplication state of a storage volume refers to whether data of the storage volume is deduplicated or not deduplicated. Data deduplication refers to removing duplicates of portions of data (e.g., data chunks) so that duplicate data portions from different data objects (e.g., different files) are not stored in a storage system.

A storage system configuration (also equivalently referred to as a "storage system characteristic") can refer to a configuration of a storage system, such as a version of an OS, a firmware, or another program in the storage system. A storage system configuration can alternatively refer to a hardware configuration, such as a physical resource characteristic, e.g., a type of processor included in the storage system, or a resource capacity of a physical resource in the storage system (e.g., a quantity of processors in the storage system, a speed of the processor(s) in the storage system, a storage capacity of a memory or other storage of the storage system, a communication bandwidth of a network interface of the storage system, etc.). As a further example, storage system configuration can refer to a load condition of the storage system, such as what percentage of the processing resources of the storage system is consumed or is available, what percentage of the storage resources of the storage system is consumed or is available, a quantity of workloads performed in the storage system, and so forth.

As another example, a storage system configuration can refer to a group that a storage system is part of. A command may specify that multiple storage systems be merged into a particular group, in which case the command is associated with an attribute that indicates (e.g., identifies) the particular group. As another example, a storage system configuration can refer to a network configuration associated with a storage system. A network configuration can be defined by a network attribute or multiple network attributes, such as network addresses (e.g., Internet Protocol (IP) addresses, Media Access Control (MAC) addresses, etc.), ports, communication protocols, security protocols, etc.

Rules that can be included in a signature can specify a condition against which an attribute (or a combination of attributes) is compared to determine if the attribute (or the combination of attributes) satisfies the condition. For example, if the size of a storage volume exceeds a size threshold, and a version of a firmware in the storage system is older than a latest version of the firmware, then that may indicate a potential fault condition if a certain type of command (e.g., a data migration command) is executed to migrate the storage volume from a source storage system to a destination storage system. Note that the version of the firmware that is checked can be the version of the firmware in the source storage system and/or in the destination storage system. In the foregoing example, the attributes of the signature include a size attribute and a firmware version attribute, and the condition specified in the signature includes a size attribute threshold and a firmware version value.

As another example, a signature can include a file system version attribute and an OS version attribute, and a condition in the signature can be whether a file system version indicated by the file system version attribute is older than a specified file system version value, and whether the OS version attribute is newer than an OS version value.

As a further example, a signature can include a resize indication attribute and an operational branches attribute, and a condition in the signature can be whether a resized storage volume is associated with a certain hierarchy of operational branches.

Other examples of signatures can also be provided.

The signature provision engine 114 can send the signatures 116 to the storage system 102-1. In the storage system 102-1, the signatures 116 can be stored in a memory 118 of the storage system 102-1. The memory 118 can be implemented using a memory device or multiple memory devices. Examples of memory devices can include any or some combination of the following: a dynamic random access memory (DRAM) device, a static random access memory (SRAM) device, a flash memory device, and so forth.

In examples according to FIG. 1, the storage controller 105 in the storage system 102-1 includes a command checking engine 120 that checks commands that request operations that involve storage systems, including the storage system 102-1. Although FIG. 1 shows the command checking engine 120 as being part of the storage controller 105, the command checking engine 120 can be separate from the storage controller 105 in other examples (some other examples are discussed in connection with FIGS. 2 and 3 further below).

In some examples, a command 122 can be issued by a host device 124. A "command" can refer to any message, information element, or other indication that causes a storage system to perform an operation indicated by the request.

The host device 124 sends the command 122 over the network 108 to the storage system 102-1 (or to multiple storage systems). The command checking engine 120 checks the command 122 with respect to the signatures 116 stored in the memory 118.

Checking a command with respect to a signature can refer to comparing attributes associated with the command to the signature, or more specifically, to a condition specified by the signature. The checking determines whether the attributes associated with the command to the signature satisfy the condition specified in the signature. The attributes associated with the command can include a storage volume attribute and a storage system attribute.

Based on the checking of the command 122 with respect to the signatures 116, the command checking engine 120 is able to make a determination of whether or not an operation indicated by the command 122 may cause a potential fault.

If the command checking engine 120 determines that an operation indicated by the command 122 may cause a potential fault, the command checking engine 120 can provide an indication of the potential fault, such as in the form of a signal, a message, an information element, and so forth. The storage controller 105 can respond to the indication of the potential fault by taking a remediation action, which can include any or some combination of the following: prevent the command from executing, halt an operation requested by the command in the storage system 102-1, power down or disable the storage system 102-1, upgrade a program (e.g., an OS, a firmware, etc.) of the storage system 102-1, send a notification to a user, and so forth.

Multiple host devices 124 can be coupled over the network 108 to the storage systems 102-1 to 102-N. Examples of host devices can include any or some combination of the following: a server computer, a user computer, or any other type of electronic device that is able to send commands to storage systems to cause operations involving the storage systems.

FIG. 1 shows an example in which the command checking engine 120 is in the same storage system 102-1 that receives the command 122 requesting performance of an operation involving the storage system 102-1.

In some examples, the operation requested by the command 122 can occur within the storage system 102-1, such as a read/write operation of data stored in the storage devices 104, a data deduplication operation in which data in the storage devices 104 are deduplicated, a data compression or decompression operation in which data in the storage devices 104 is compressed or decompressed, a data encryption or decryption operation in which data in the storage devices 104 is encrypted or decrypted, a configuration operation in which the storage system is configured, and so forth.

Configuring a storage system can refer to changing a setting or other characteristic of the storage system, such as by changing parameters that control operations of an operating system (OS), firmware, or other program of the storage system. Configuring a storage system can alternatively refer to changing a program in the storage system, such as by upgrading the program, adding a program, or removing a program.

In some examples, in addition to the command checking engine 120 that can be included in the storage system 102-1 or elsewhere, the analytics system 110 can also include a storage system identification engine 130 that can identify storage systems that may be vulnerable to faults. For example, based on the analysis performed by the statistics analysis engine 112, a determination can be made that storage systems with certain storage system configurations may be vulnerable to faults if certain commands are executed with respect to such storage systems. The determination may be made by a human, or by a machine or program using classifiers or machine-learning models.

The storage system identification engine 130 produces a list 132 of storage systems that are identified as vulnerable to faults, and correlates the storage systems in the list 132 to corresponding commands that may trigger respective faults. When a command, such as the command 122, is detected by the analytics system 110, the analytics system 110 compares the command to the correlated commands in the list 132 of storage systems. If the command matches a command in the list 132 of storage systems, then the analytics system 110 can notify the storage system(s) correlated to the matching command by the list 132 of storage systems, to inform the notified storage systems that the storage system(s) may experience a fault if the command were executed. The storage system(s) can then take action to not execute the command, or to stop the operation initiated by the command, or to take another remediation action.

Figure 2:
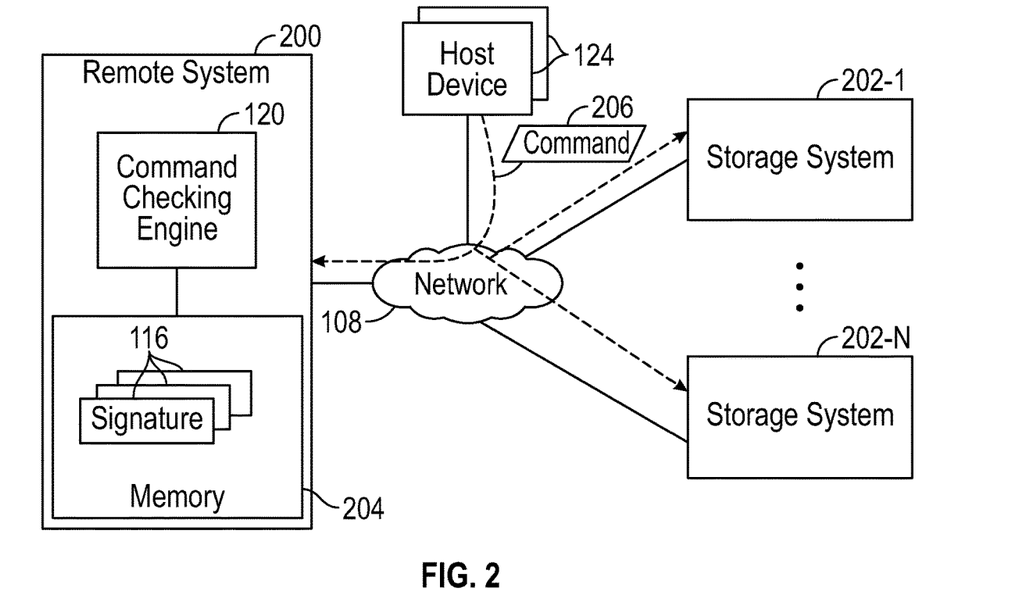

FIG. 2 shows another example in which the command checking engine 120 is implemented in a remote system 200 that is remotely located from storage systems 202-1 to 202-N. Each storage system 202-$i$, i=1 to N, includes a storage device or multiple storage devices, as well as a storage controller that manages the access of the storage device(s).

In some examples, the remote system 200 can be the analytics system 110 of the FIG. 1. In other examples, the remote system 200 can be separate from each of the analytics system 110 and the storage systems 202-1 to 202-N.

The remote system 200 includes a memory 204 that stores the signatures 116. In examples where the remote system 200 is the analytics system 110, signatures 116 provided locally by the signature provision engine 114 is stored in the memory 204. In other examples where the remote system 200 is separate from the analytics system 110, the signature provision engine 114 of the analytics system 110 sends the signatures 116 to the remote system 200, such as over the network 108.

A host device 124 sends a command 206 to a storage system 202-1 or to multiple storage systems 202-1 to 202-N. The command 206 is also received by the command checking engine 120 in the remote system 200, which performs a check of the command 206 with respect to the signatures 116. If the command checking engine 120 indicates that a potential fault may occur, the command checking engine 120 can send such an indication to a storage system or multiple storage systems (any of 202-1 to 202-N that may experience a fault). The storage system that receives the fault indication from the remote system 200 can take a remediation action in response to the fault indication.

Figure 3:
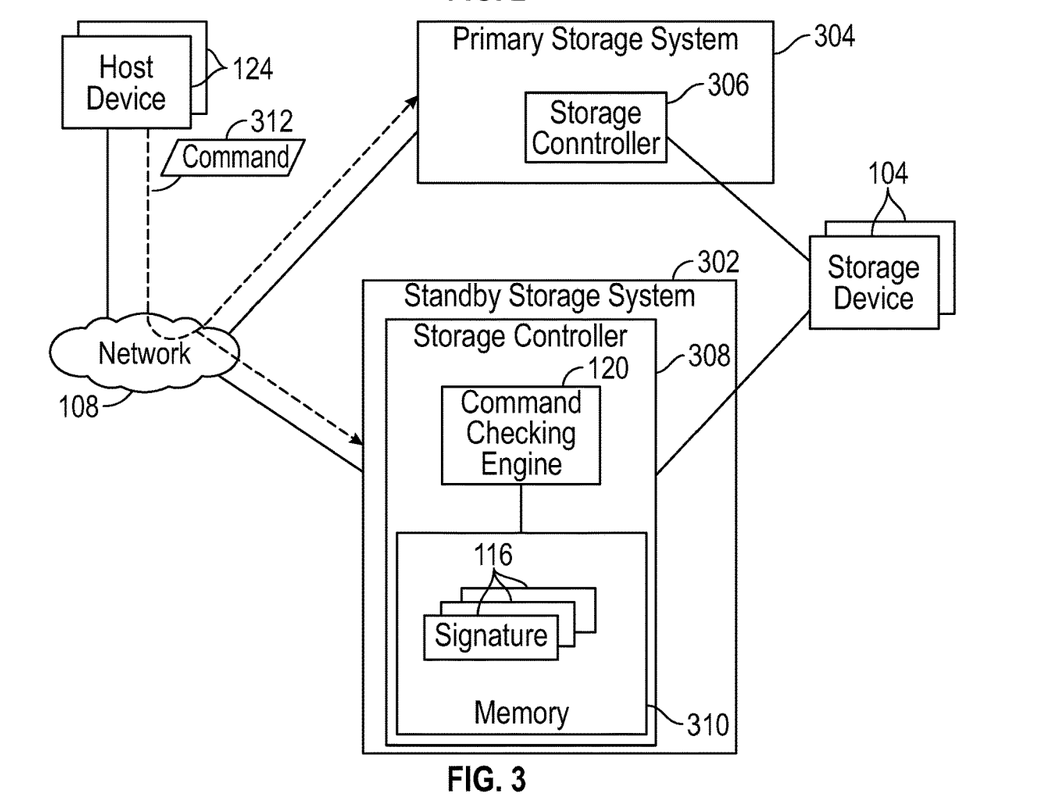

FIG. 3 shows another example arrangement in which the command checking engine 120 is provided in a standby storage system 302 that is associated with a primary storage system 304.

The standby storage system 302 is provided for high availability (HA) purposes, in case of a fault experienced by the primary storage system 304. Should the primary storage system 304 experience a fault that prevents the primary storage system 304 from continuing to function properly, the standby storage system 302 can take over operations on behalf of the primary storage system 304.

In the example of FIG. 3, a storage controller 306 of the primary storage system 304 and a storage controller 308 of the standby storage system 302 can both access the same collection of storage devices 104. In other examples, each of the primary storage system 304 and the standby storage system 302 can include their respective different collection of storage devices.

The command checking engine 120 is included in the storage controller 308 of the standby storage system 302. The storage controller 308 includes a memory 310 that stores the signatures 116, which may be received from the analytics system 110 (FIG. 1). Since the standby storage system 302 may be idle or otherwise may have a lower workload than the primary storage system 304, performing the command checking at the standby storage system 302 provides a more effective use of resources of the storage systems 304 and 302.

A host device 124 can issue a command 312 over the network 108 to the primary storage system 304, to request an operation involving the primary storage system 304. The command 312 is also received by the command checking engine 120 in the standby storage system 302.

If the command checking engine 120 in the standby storage system 302 detects a potential fault associated with the command 312, the command checking engine 120 can send a fault indication to the primary storage system 304, either over the network 108 or over a dedicated communication link between the primary storage system 304 and the standby storage system 302. The fault indication can be used by the primary storage system 304 to take a remediation action to address the potential fault condition.

Figure 4:
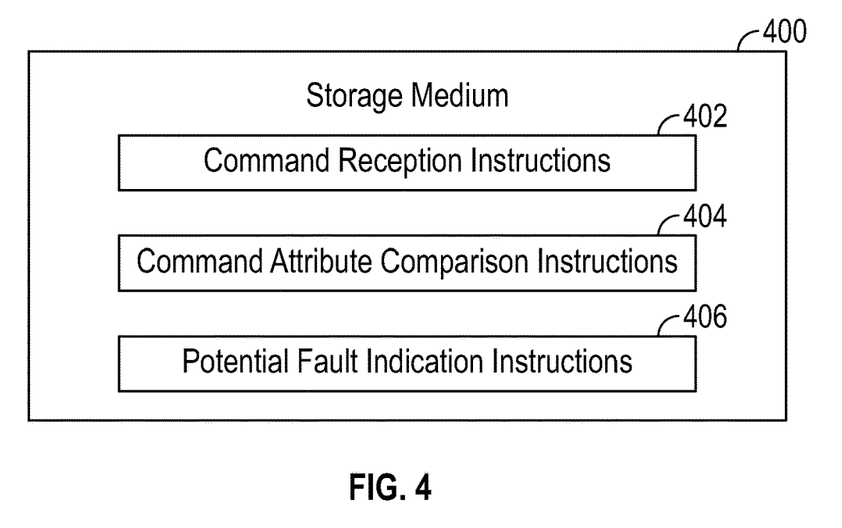
FIG. 4 is a block diagram of a storage medium storing machine-readable instructions according to some examples of the present disclosure.

FIG. 4 is a block diagram of a non-transitory machine-readable or computer-readable storage medium 400 storing machine-readable instructions that upon execution cause a system to perform various tasks. The system can include a storage system, a remote system that is remote from a storage system, or a standby storage system.

The machine-readable instructions include command reception instructions 402 to receive a command for an operation involving a storage system. For example, the command can be received from a host device 124 in FIG. 1, 2, or 3.

The machine-readable instructions include command attribute comparison instructions 404 to compare attributes associated with the command to a signature, where the signature is based on a storage volume characteristic and a configuration of the storage system.

For example, the storage volume characteristic includes a size of a storage volume, and the comparison is to determine whether the size of the storage volume satisfies a size condition.

As another example, the storage volume characteristic includes a file system version associated with a storage volume, and the comparison is to determine whether the file system version associated with the storage volume satisfies a condition (e.g., is older or newer than a specific file system version).

As a further example, the storage volume characteristic includes operational branches associated with a storage volume, and the comparison is to determine whether the operational branches associated with the storage volume satisfy a condition (e.g., includes a specific hierarchy of operational branches).

As a further example, the storage volume characteristic includes an indication of whether a storage volume was resized, and the comparison is to determine whether the storage volume was resized.

As a further example, the storage volume characteristic includes an encryption state, a compression state, or a deduplication state of a storage volume, and the comparison is to determine whether the encryption state, the compression state, or the deduplication state of the storage volume satisfies a specified condition.

As an example, the configuration of the storage system includes a version of a program (e.g., an OS, a firmware, or another program) in the storage system, and the comparison is to determine whether the version of the program satisfies a condition (e.g., whether the version of the program is newer or older than a specified program version).

As a further example, the configuration of the storage system includes a physical resource characteristic of the storage system, and the comparison is to determine whether the physical resource characteristic of the storage system satisfies a condition.

As a further example, the configuration of the storage system includes a load condition of the storage system, and the comparison is to determine whether the load condition of the storage system satisfies a condition.

As a further example, the configuration of the storage system includes a group to which the storage system belongs, and the comparison is to determine whether the group to which the storage system belongs satisfies a condition.

As a further example, the configuration of the storage system includes a network configuration associated with the storage system, and the comparison is to determine whether the network configuration satisfies a condition.

The machine-readable instructions include potential fault indication instructions 406 that are responsive to the comparison of the attributes associated with the command to the signature, to indicate a potential fault associated with the operation indicated by the command.

Figure 5:
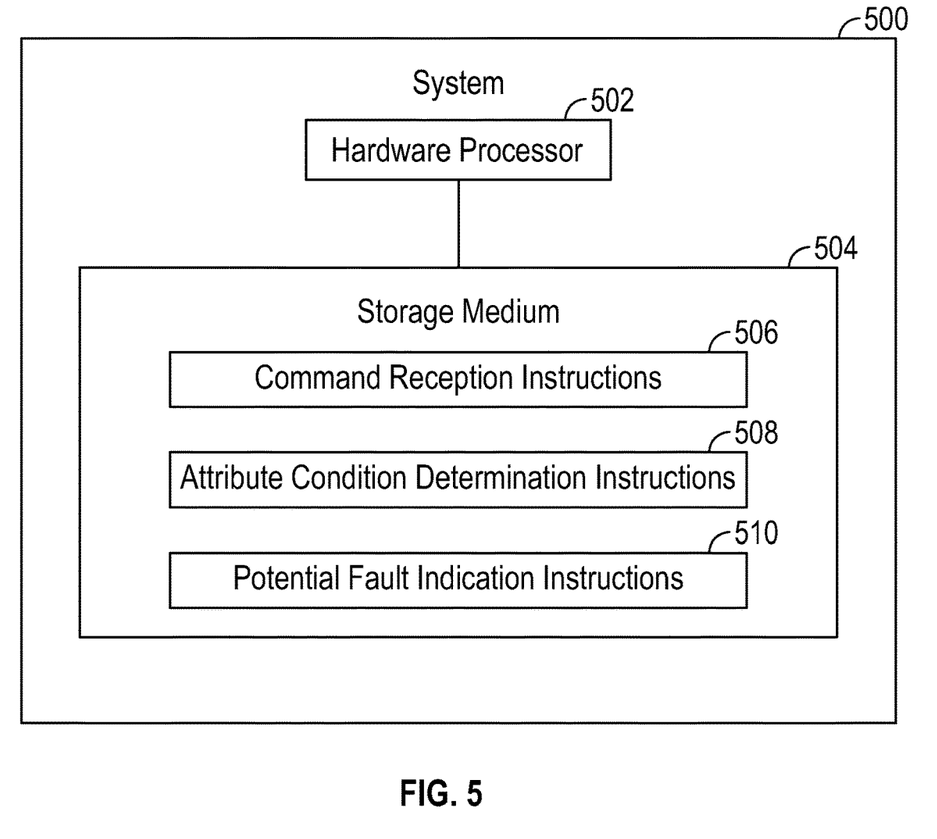
FIG. 5 is a block diagram of a system according to some examples.

FIG. 5 is a block diagram of a system 500 that includes a hardware processor 502 (or multiple hardware processors). The system 500 further includes a storage medium 504 storing machine-readable instructions that are executable on the hardware processor 502 to perform various tasks.

A hardware processor can include a microprocessor, a core of a multi-core microprocessor, a microcontroller, a programmable integrated circuit, a programmable gate array, or another hardware processing circuit. Machine-readable instructions executable on a hardware processor can refer to the instructions executable on a single hardware processor or the instructions executable on multiple hardware processors.

The machine-readable instructions in the storage medium 504 include command reception instructions 506 to receive a command for an operation involving a storage system.

The machine-readable instructions in the storage medium 504 include attribute condition determination instructions 508 to determine whether attributes associated with the command satisfy any signature of a plurality of signatures that are based on statistics relating to operations of storage systems, where a signature of the plurality of signatures corresponds to a storage volume characteristic and a storage system configuration.

The machine-readable instructions in the storage medium 504 include potential fault indication instructions 510 to in response to determining that the attributes associated with the command satisfy a first signature of the plurality of signatures, provide an indication of a potential fault associated with the operation indicated by the command.

Figure 6:
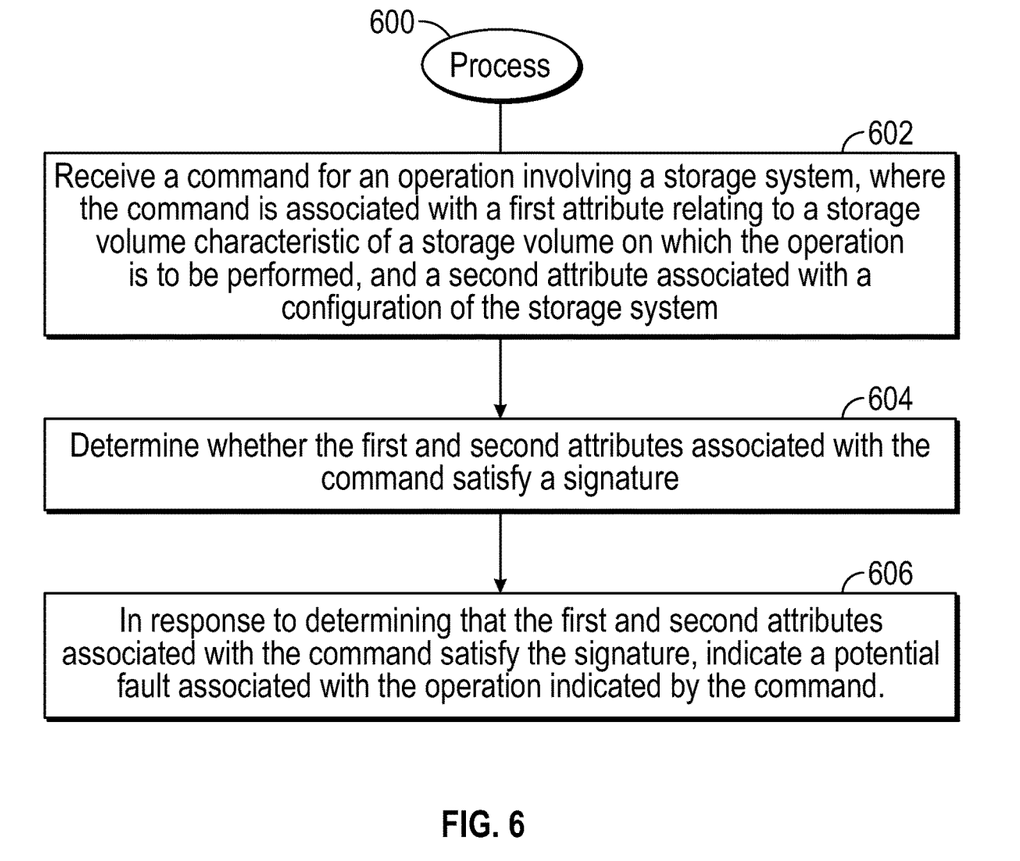
FIG. 6 is a flow diagram of a process according to further examples.

FIG. 6 is a flow diagram of a process 600 according to some examples, which can be performed by a system (e.g., a storage system, the analytics system 110 of FIG. 1, the remote system 200 of FIG. 2, the standby storage system 302 of FIG. 3, etc.).

The process 600 includes receiving (at 602) a command for an operation involving a storage system, where the command is associated with a first attribute relating to a storage volume characteristic of a storage volume on which the operation is to be performed, and a second attribute associated with a configuration of the storage system.

The process 600 includes determining (at 604) whether the first and second attributes associated with the command satisfy a signature.

The process 600 includes, in response to determining that the first and second attributes associated with the command satisfy the signature, indicating (at 606) a potential fault associated with the operation indicated by the command.

A storage medium (e.g., 400 of FIG. 4 or 504 of FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   receive a command for an operation involving a storage system;
   compare attributes associated with the command to a signature, the signature based on a storage volume characteristic and a configuration of the storage system; and
   responsive to the comparison of the attributes associated with the command to the signature, indicate a potential fault associated with the operation indicated by the command.

2. The non-transitory machine-readable storage medium of claim 1, wherein the storage volume characteristic comprises a size of a storage volume, and the comparison is to determine whether the size of the storage volume satisfies a size condition specified by the signature.

3. The non-transitory machine-readable storage medium of claim 1, wherein the storage volume characteristic comprises a file system version associated with a storage volume, and the comparison is to determine whether the file system version associated with the storage volume satisfies a condition specified by the signature.

4. The non-transitory machine-readable storage medium of claim 1, wherein the storage volume characteristic comprises operational branches associated with a storage volume, and the comparison is to determine whether the operational branches associated with the storage volume satisfy a condition specified by the signature.

5. The non-transitory machine-readable storage medium of claim 1, wherein the storage volume characteristic comprises an indication of whether a storage volume was resized, and the comparison is to determine whether the storage volume was resized.

6. The non-transitory machine-readable storage medium of claim 1, wherein the storage volume characteristic comprises an encryption state, a compression state, or a deduplication state of a storage volume, and the comparison is to determine whether the encryption state, the compression state, or the deduplication state of the storage volume satisfies a specified condition specified by the signature.

7. The non-transitory machine-readable storage medium of claim 1, wherein the configuration of the storage system comprises a version of a program in the storage system, and the comparison is to determine whether the version of the program satisfies a condition specified by the signature.

8. The non-transitory machine-readable storage medium of claim 1, wherein the configuration of the storage system comprises a physical resource characteristic of the storage system or a load condition of the storage system, and the comparison is to determine whether the physical resource characteristic or the load condition of the storage system satisfies a condition specified by the signature.

9. The non-transitory machine-readable storage medium of claim 1, wherein the configuration of the storage system comprises a group to which the storage system belongs, and the comparison is to determine whether the group to which the storage system belongs satisfies a condition specified by the signature.

10. The non-transitory machine-readable storage medium of claim 1, wherein the configuration of the storage system comprises a network configuration associated with the storage system, and the comparison is to determine whether the network configuration satisfies a condition specified by the signature.

11. The non-transitory machine-readable storage medium of claim 1, wherein the storage system is a primary storage system, and the system at which the instructions are executable is a standby storage system associated with the primary storage system.

12. The non-transitory machine-readable storage medium of claim 1, wherein the system at which the instructions are executable is the storage system, and the instructions upon execution cause the storage system to:
   receive the signature from a remote system that derived the signature based on analytics performed on statistics associated with operations of storage systems.

13. The non-transitory machine-readable storage medium of claim 1, wherein the system at which the instructions are executable is remote from the storage system, and wherein the instructions upon execution cause the system to:
   send, to the storage system over a network, an indication of the potential fault associated with the operation indicated by the command.

14. The non-transitory machine-readable storage medium of claim 13, wherein the instructions upon execution cause the system to:
   identify a plurality of storage systems that are vulnerable to faults;
   receive, over the network from a first storage system of the plurality of storage systems, information relating to a given command to be executed at the first storage system;
   determine that the first storage system is one of the plurality of storage systems; and
   in response to receiving the information relating to the given command and determining that the first storage system is one of the plurality of storage systems, send, to the first storage system over the network, an indication of a potential fault associated with an operation indicated by the given command at the first storage system.

15. A system comprising:
a processor; and
a non-transitory storage medium storing instructions executable on the processor to:
receive a command for an operation involving a storage system;
determine whether attributes associated with the command satisfy any signature of a plurality of signatures that are based on statistics relating to operations of storage systems, wherein a first signature of the plurality of signatures corresponds to a storage volume characteristic and a storage system configuration; and
in response to determining that the attributes associated with the command satisfy a condition specified by the first signature of the plurality of signatures, provide an indication of a potential fault associated with the operation indicated by the command.

16. The system of claim 15, wherein the processor and the non-transitory storage medium are part of the storage system, and wherein the instructions are executable on the processor to:
cause a halt in the operation or prevent execution of the command in response to the indication of the potential fault.

17. The system of claim 16, wherein the instructions are executable on the processor to:
receive the plurality of signatures over a network from a remote system that derived the plurality of signatures based on analytics on the statistics relating to the operations of the storage systems.

18. The system of claim 17, wherein the network comprises a management communication channel over which the plurality of signatures are received and over which the instructions are executable on the processor to send heartbeat indications to the remote system.

19. A method comprising:
receiving, by a system comprising a hardware processor, a command for an operation involving a storage system, wherein the command is associated with a first attribute relating to a storage volume characteristic of a storage volume on which the operation is to be performed, and a second attribute associated with a configuration of the storage system;
determining, by the system, whether the first and second attributes associated with the command satisfy a signature by comparing the first and second attributes to a condition specified by the signature; and
in response to determining that the first and second attributes associated with the command satisfy the signature, indicating, by the system, a potential fault associated with the operation indicated by the command.

20. The method of claim 19, wherein the storage system is a primary storage system, and the system is a standby storage system associated with the primary storage system, and wherein the receiving, the determining, and the indicating are performed by the standby storage system.

* * * * *